United States Patent [19]

Candelaria

[11] 3,989,327
[45] Nov. 2, 1976

[54] CYCLE SAFETY AND LOCKER DEVICE
[76] Inventor: Arthur R. Candelaria, 8019 Bell Ave., SE., Albuquerque, N. Mex. 87108
[22] Filed: Dec. 30, 1974
[21] Appl. No.: 537,418

[52] U.S. Cl. .................................. 312/100; 211/5; 70/81; 312/254; 292/DIG. 3
[51] Int. Cl.² .................. A47B 81/00; E05B 73/00
[58] Field of Search ...................... 211/4, 17, 5, 22; 312/100; 248/280, 214, 215, 203; 70/234, 81; 292/DIG. 3

[56] References Cited
UNITED STATES PATENTS
2,655,424   10/1953   O'Connor ........................ 211/4 X
3,223,245   12/1965   Weitzman ........................ 211/4
3,827,773   8/1974    Aiello ............................... 211/5

Primary Examiner—Casmir A. Nunberg
Attorney, Agent, or Firm—Armstrong, Nikaido & Wegner

[57] ABSTRACT

A locker device designed to accommodate various types of cycle-type vehicles, whether motorized or not, and designed to accommodate all shapes and sizes of such cycles including safety equipment and related paraphernalia and including a locker in the form of a hollow container with sides, ends, top, bottom and openings with a means attached thereto for securing the cycle to the locker and a means for securing the locker to the surface upon which it is located, and particularly the employment of angular portions around the periphery of the door and opening to the locker to render the same substantially entry-proof when ordinary pry tools are employed.

1 Claim, 15 Drawing Figures

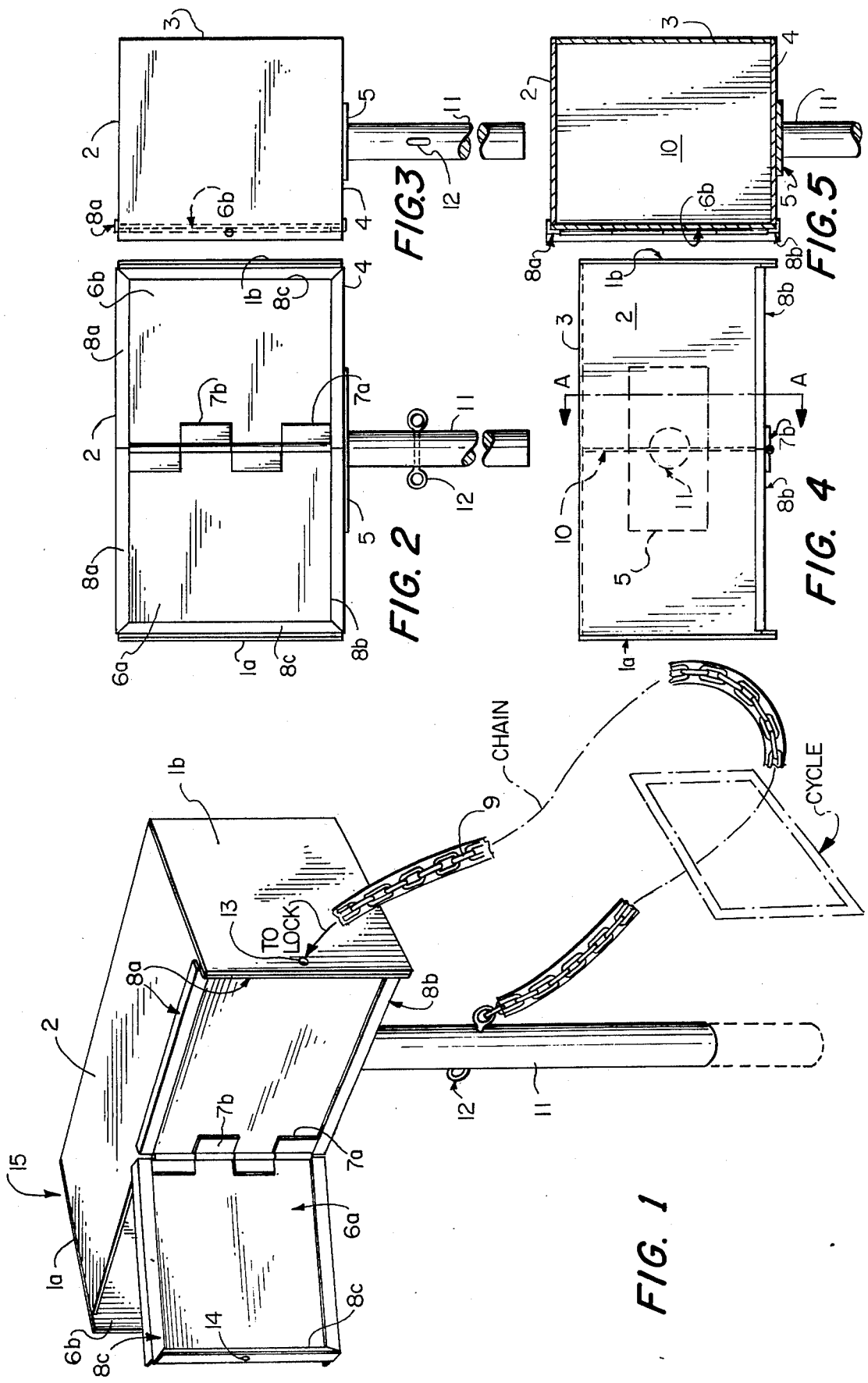

3,989,327

CYCLE SAFETY AND LOCKER DEVICE

BACKGROUND OF THE INVENTION

The popularity of bicycles and motorcycles and similar vehicles has increased greatly with their use being not only for convenience, sport and the like, but also for necessity. Due to the character of these vehicles, security has become a great problem when they are parked and left by their owners or operators for any given period of time.

Moreover, another problem which has arisen has been the need to store small articles of personal belongings or the like which the rider or owner of the vehicles might not wish to carry with him when he leaves the vehicle. These such items would include helmets, gloves and small purchases being carried on the vehicle.

While devices have been created to overcome these problems, they have been deficient and wanting in several respects and particularly with regard to the security aspect since, prior devices have been susceptible to entry through the use of common tools carried in automobiles and the like such as screwdrivers, pliers, wrenches and the like.

In the past, a variety of devices developed to meet and overcome the difficulties encountered with regard to convenience and security for the owner and operators of cycle-type vehicles have failed to alleviate the problem.

Attempts to remedy the defects and drawbacks from the past and to overcome the difficulties and problems which have been encountered include the use of poles, racks, retainers and other such devices. However, none of these devices has ever overcome, to any satisfactory degree, the security problem of entry with common minor tools nor have they combined such a security feature with the conveniences outlined above.

Locker constructions of various types have been used for many years in a variety of locations including bus terminals, airline terminals and related places. However, it is anticipated that the locker of the present invention will be located principally outdoors and, particularly, in parking lots and other similar places designed for the mass location of cycle-type vehicles. This not only makes the need for convenience greater but also the need for security much greater due to the increased availability of such a location to those who might wish to do damage or harm to the property of the cycle owner.

Therefore, it is the primary object of the present invention to provide a device which overcomes the problems and deficiencies associated with past locker devices and particularly to provide such a device which will be tamper proof against the common minor tools used for such purposes and also to provide a device which will be, as well, convenient for the storage of personal items as well as the locking of the cycle itself.

Another object of the present invention is to provide a locker device which includes a locker with at least one door, an opening, bottom, top, sides and ends as well as a means for anchoring the same into whatever surface it is located upon, all with a design toward maximum security against tampering as well as combining this feature with convenience and simplicity.

Another object of the present invention is to provide a locker device which is inexpensive of construction and function and simple in its use and which is not prone to fall into disrepair and which may be provided for use on a mass basis and that will be secure and convenient.

A still further object of the present invention is to provide a locker device which is adaptable to and capable of mounting in a variety of locations and which is useful with a variety of cycle-type vehicles and which combines security against tampering with convenience and simplicity in construction.

Yet another object of the present invention is to provide a device as indicated which is capable of the functions referred to and which is based upon sound principles of construction and includes a locker in the form of a hollow container, locking means and a means for placing it into the surface upon which it is contemplated that such a device shall be located and including an opening to receive personal articles.

Other objects will appear hereinafter.

SUMMARY OF THE INVENTION

In accordance with the present invention, a device in the form of a locker is employed which is in the nature of a hollow container and includes a top, bottom, sides and ends as well as at least one opening to receive articles and a door to cover the opening and receive the locking means and lock mechanism wherein that locking means is attached to the locker and to the vehicle to be secured and is subsequently further secured to a means for implanting the locker device in the surface upon which it is to be located, and which includes specific structural means designed to render the opening and door covering secure against tampering with common, simple, minor tools.

BRIEF DESCRIPTION OF THE DRAWINGS

For a more complete understanding of my invention, reference will be made to the attached drawing figures forming a part of the present application. The drawing figures are comprised of the following:

FIG. 1 is a perspective view of the locker device of the present invention.

FIG. 2 is a front view of the locker device.

FIG. 3 is a side view of the locker device.

FIG. 4 is a bottom view of the locker device.

FIG. 5 is a sectional view taken along Section line A—A of FIG. 4.

DETAILED DESCRIPTION OF THE DRAWINGS

Figure 6:
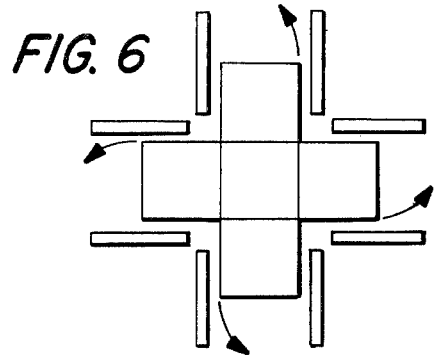
FIG. 6 is a schematic view comprised of four lockers in a patterned relationship.
Figure 7:
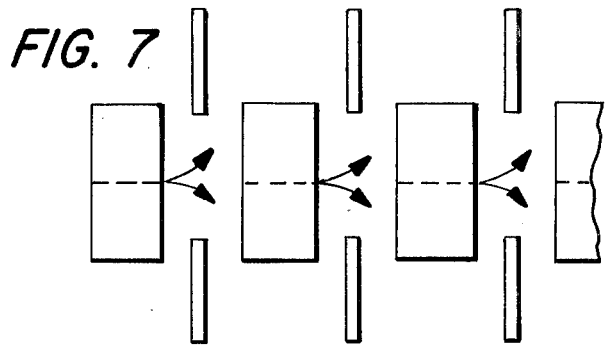
FIG. 7–15 represent a series of schematic views disclosing a variety of arrangements of locker devices of the present invention in various patterns.
Figure 8:
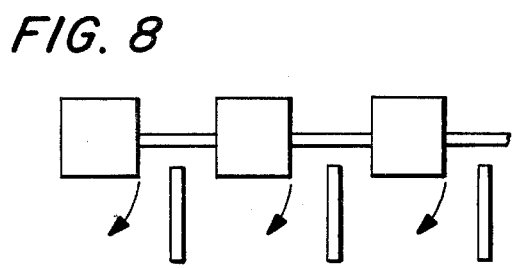
Figure 9:
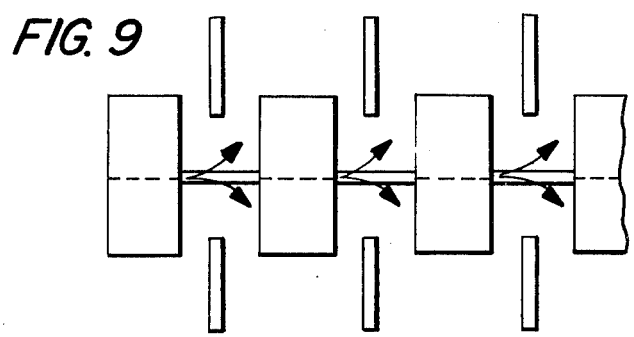
Figure 10:
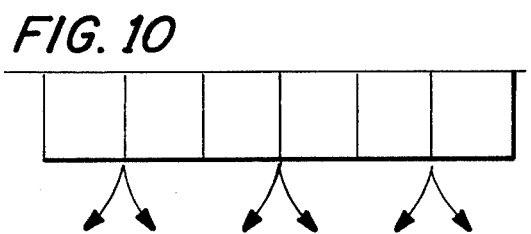
Figure 11:
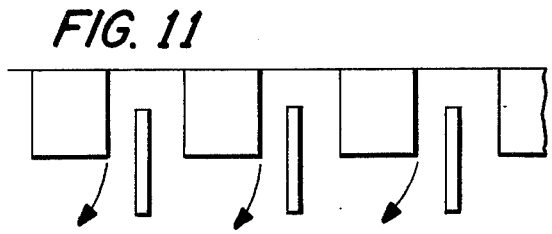
Figure 12:
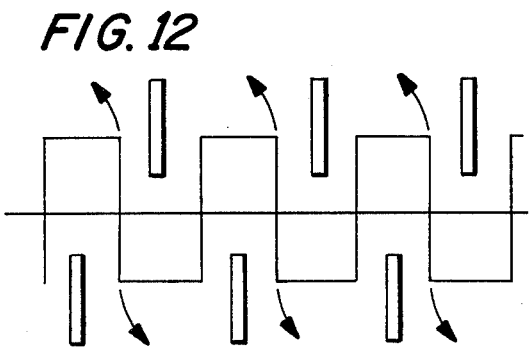
Figure 13:
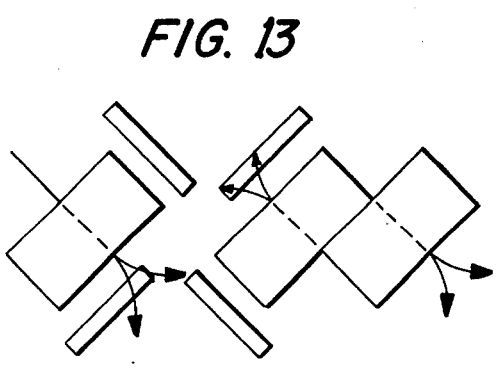
Figure 14:
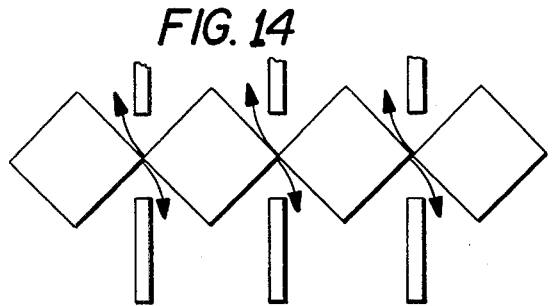
Figure 15:
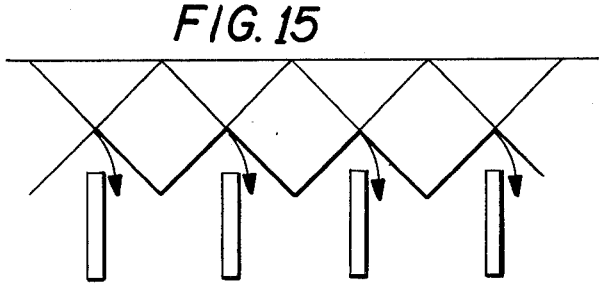

It is anticipated that the locker device of the present invention will be constructed of any material substantial enough to resist break-ins with and tampering by common ordinary, simple tools normally carried by motorists and cyclists for their use in minor repair to their vehicles and to resist, as well, the normal elements such as rain, snow, hail and the like. As well, the material used may be substantially fireproof in order to render protection against this hazard.

It is anticipated that the present device will be used and employed in automobile parking area type situations with the use of an attendant or coin operated collection drops.

It is anticipated that the locker device will be anchored into the ground surface whether it be of earth, concrete, asphalt or whatever type surface. A chain or other device such as a cable or the like which is attached for locking the vehicle will pass from the anchor element through the frame of the vehicle and back to the locker door where a lock of any known kind will serve the purpose of securing both the container and the vehicle.

Referring now to the figures of the drawings and to the details of the construction and functioning of the present invention, it should be noted that numerals 1–15 comprise the various parts of the device. Particularly, numeral 15 represents the container, numeral 1a and 1b are the left and right end portions of the container 15, as identified from a position facing the doors 6a and 6b. One of the doors may be securely fastened such as door 6b while the other is more frequently used as the opening to receive various articles to be placed within the locker. By use of a partition 10, the container may be divided longitudinally where the doors meet, thus permitting a single device to accommodate two vehicles. Moreover, the door 6a, it is anticipated, will be employed, through opening 14, therein to cooperate with opening 13 and end 1b so as to receive a lock mechanism of any known kind, and the locking means 9 such as a chain or cable. Numeral 2 refers to the top of the locker while numeral 4 refers to the bottom and numeral 3 refers to the sides. One side 3, of course, will be comprised of the doors 6a and 6b.

a reinforcement support element 5 represents a structure, such as a plate of metal or the like, designed to reinforce the point where the locker is attached to the base or stand 11 which may be a pole, tube or the like constructed of any strong material which is designed to be inserted into ground or other surface upon which the locker device is to be located.

Parts 7a and 7b are the hinges attached to the container doors to permit their movement in a verticle plane. The locking means such as a chain or cable 9 is designed to cooperate with any known locking mechanism for attachment through openings 13 and 14 in the end 1b and the door 6a, respectively. While one end of the locking means such as the chain or cable cooperates with the lock in said openings 13 and 14, the other end is attached to an anchor element 12 which is securely fitted into the support 11. It is anticipated that the chain or cable 9 will pass through the vehicle as represented in FIG. 1.

A most important and critical feature of the present invention is the angle elements 8a, 8b, 8c which are located around the periphery of the container portion which defines the opening and on the interior periphery of the doors or doors designed to cover the opening or openings with a design and construction such that when the door is in a closed position, entry therethrough with the common repair tools such as a screwdriver, wrench, pliers or the like is substantially prevented. These angle parts 8a, 8b, 8c, are reinforcement pieces located angularly along the periphery of the top 2, bottom 4 and end portions 1a and 1b of the container which define the opening as well as the inside periphery of the doors so that when placed in a closed facing relationship they exclude any opening space through which a pry element such as a screwdriver, pliers or wrench might be inserted.

In the operation and function of the present locker device, a person desiring to park a cycle-type vehicle would place in proximate relationship to the locker device, take the chain or cable and insert the free end through the vehicle at a location such as the frame or tire and rim and connect the free end by any known lock mechanism to the container 15 by openings 13 and 14 in the end 1b and door 6b, respectively. Prior to locking the chain or cable to the door 6b and end of the locker, personal items such as a helmet, gloves or purchases or the like may be conveniently placed in the container 15 itself. The overall dimensions of the locker device may be adapted and suited to any particular needs. It is contemplated that the container portion 15 shall be large enough to contain personal articles such as a helmet, gloves or the like but not so large as to become cumbersome. When the door is closed in a faced relationship with the periphery of the opening it covers and the lock mechanism attached, a secure environment is created not only for the personal articles within the locker on the locking device but also for the vehicle attached thereto.

From the foregoing, it may be seen that I have provided a useful device which is employed to secure vehicles and personal items, especially in open spaces. The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the aforegoing description and all changes which come within the meaning and range of equivalency of the claims is therefore intended to be embraced therein.

What is claimed is:

1. A locker device comprising a container composed of a top, bottom, side and end elements located in spaced relation to form an enclosure wherein one side is comprised of at least one door to cover an opening to receive articles of varying size, a support element extended vertically from the locker, a locking means, one end of which is securely fixed to the support element and the other end of which is received by the locker and attached thereto by a lock mechanism, with the locking means being affixed to the support by an anchor where the door and end portion corresponding thereto contain openings which cooperate with the lock mechanism and other end of the locking means, a re-enforcement plate located at the junction of container and the support means, and a center plate dividing the container compartment into two separate areas wherein angle elements are located along the periphery of the door as well as the periphery of the end, top and bottom of the locker which form the opening that the door covers.

* * * * *